United States Patent [19]
Busse

[11] 3,846,925
[45] Nov. 12, 1974

[54] FRAME MEANS

[76] Inventor: Rido Busse, Napoleonweg 6-8, 7911 Oberelchingen, Germany

[22] Filed: Aug. 1, 1972

[21] Appl. No.: 276,967

[30] Foreign Application Priority Data
  Aug. 11, 1971   Germany............................ 2140231
  Aug. 11, 1971   Germany............................ 2140232
  Jan. 25, 1972   Germany............................ 2203387

[52] U.S. Cl. ............................................... 40/16.2
[51] Int. Cl. ............................................ G09f 3/18
[58] Field of Search ............... 40/10, 16, 16.2, 16.4, 40/16.6

[56] References Cited
UNITED STATES PATENTS

| | | | |
|---|---|---|---|
| 1,933,974 | 11/1933 | Grimshaw | 40/16.2 X |
| 2,489,089 | 11/1949 | Graff et al. | 40/16.2 |
| 2,608,777 | 9/1952 | Schuler | 40/16.2 |
| 2,626,472 | 1/1953 | Stingl | 40/16.6 X |

*Primary Examiner*—Melvin D. Rein
*Assistant Examiner*—Wenceslao J. Contreras
*Attorney, Agent, or Firm*—Ernest F. Marmorek

[57] ABSTRACT

A frame for receiving removably at least one two-dimensional visual object has edge supports for receiving therein the edges of the object, and a back support connected with relation to the edge supports, for the supporting of the object when placed in the frame. The edge supports are spaced apart from each other for a distance slightly smaller than the corresponding dimension of the flat object thus, the object when placed into the frame will assume a concave position lying against the back support.

1 Claim, 8 Drawing Figures

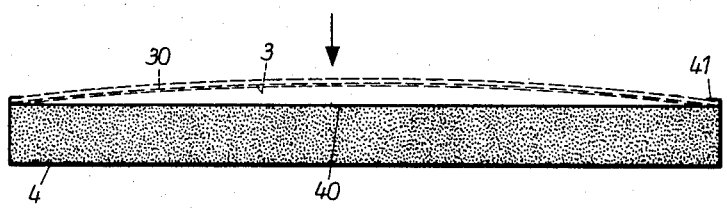
Fig. 4
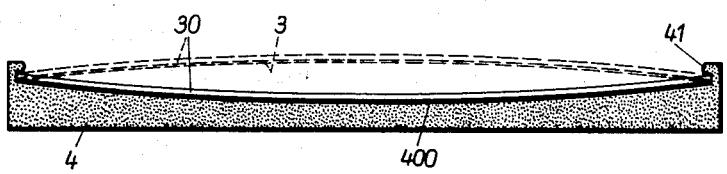
Fig. 5
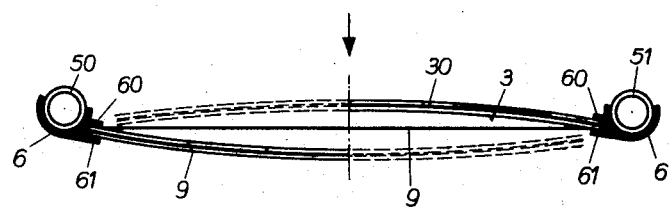
Fig. 7
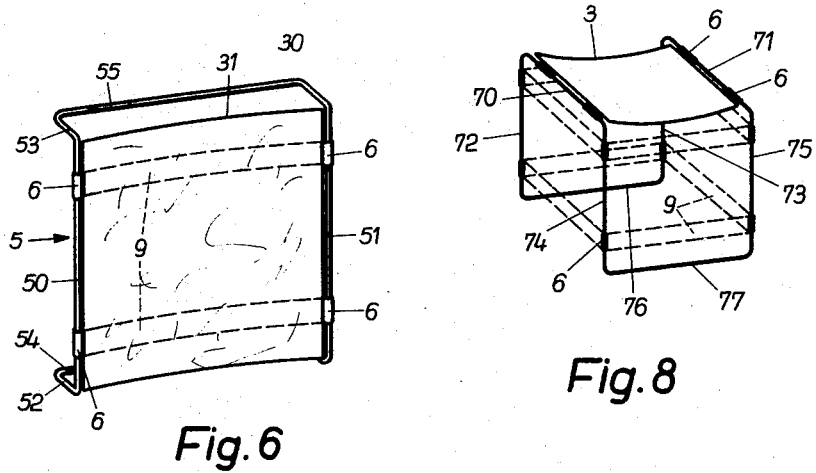
Fig. 6
Fig. 8

FRAME MEANS

FIELD OF THE INVENTION

The present invention relates to a frame for receiving releasably therein flexible, preferably two dimensional objects of observation, such as pictures, display materials, demonstration boards, posters, decoration materials, price displays, etc.

BACKGROUND OF THE INVENTION

Such frames are known as picture frames and they comprise a flat base plate and securing edges connected with the base plate which are usually in the form of a profile frame. Both securing edges have a certain distance from each other which distance corresponds exactly to the picture which will be received in between. For inserting the picture, it is shoved into a frame portion and the oppositely lying frame portion becomes bent back to an extent that the picture can be put into its place over the edge of its frame portion.

Such frames which can be used also for other purposes have several disadvantages:

First of all, the insertion of the picture and, if there is a cover glass, is not so simple. Damage to the picture or to the cover glass is difficult to avoid and, this is true especially in the case when the picture is large.

In order that the picture could be inserted well into its position, the back wall as well as the middle portion of the frame must be made relatively movable, so that the frame itself cannot be made rigid either. Also the frame can be placed on a wall only and cannot be set up on a table since no additional securing means are provided with it, or at least provision of such additional securing means, if any, is very complicated.

SUMMARY OF THE INVENTION

It is, therefore, an object of the present invention to eliminate the above-described shortcomings and disadvantages of known picture frames of this type and to provide a novel picture frame of this type having improved and new characteristics and parts not found in the hitherto known picture frames of similar type.

According to the present invention the frame comprises a pair of oppositely lying securing or holding edges for receiving therein an object of observation or picture and a back support for the object of observation or picture, and that the distance of the holding or securing edges from each other is smaller by a slight amount than the corresponding dimension of the object of observation to be placed therebetween and, the back support for the object of observation, or picture in the middle of the frame means lies so far behind a straight line connecting the holding or securing edges that the object of observation or picture when inserted into position into the frame means assumes a concave position.

Within the scope of the present invention under two dimensional objects of observation, or pictures, one should understand all flat boards which can be rigid or flexible as a sheet of pater and, which are meant for display purposes, decorations, or instruction purposes or which carry ornamental decorations, or which are simple pictures or photographs.

Securing or holding edges within the meaning of the present invention are oppositely lying supports for the edges of the object of observation. In a preferred embodiment of the present invention they can be formed as a U-profile the apex of which can be selected to accommodate not only the picture of observation but also, in some cases, a transparent covering means and it should overlap such picture and the covering means only by a few millimeters.

The back support in the scope of the present invention can be a surface, it is, however, possible that the back support is in the form of a screen or in the form of a point or circle. If it is made rigid then it should be provided with a large radius and it should run in a steady contour from one of the securing edges to the other of the securing edges.

The extent of the concavity is determined by the individual case of use. It is preferred for the proper functioning of the frame within the scope of the present invention when the height of the back support in the middle is about 5-10mm removed from the straight line connecting both securing edges.

Notwithstanding the disclosed wide span between the holding edges of the frame according to the present invention which can be used for the holding of pictures or as stands for price boards or posters or instruction boards, it is within the scope of the present invention to have such spanning distance varied to satisfy the needs of a particular use, such as covering the walls of a space or displaying larger objects at fairs, consequently, the frame of the present invention can be varied to a great extent to satisfy a particular need without departing from the spirit and scope of the invention.

It is within the scope of the present invention that the frame means including the back support for the object of observation to be made completely rigid so that the shape of the back support will determine the extent of the concavity.

It is also within the scope of the present invention that the frame which is provided with rigid holding or supporting edges is provided with a back support made from an elastic material in the form of an insert which does not necessarily have to define the concavity of the object of observation when the object of observation is placed into its position. It is rather the picture itself which defines the concavity than the back support means in this case.

As mentioned above in connection with a first preferred embodiment of the frame means according to the present invention the object of observation can be either rigid or flexible, therefore, either the object of observation must be rigid enough or the object of observation must be provided with a cover means in the second preferred embodiment, so that it can be pressed from a convex shape into the concave shape and remain in the latter position.

The elastic back support can be made according to the present invention from a full surface or from individual strips spaced from each other and made from an elastic material.

As a covering means for the picture according to the present invention one may use synthetic foils having a certain extent of flexibility and a thickness which limits their elasticity to a desired extent.

The frame means can be made from flat portions but it is within the scope of the present invention that the frame in its final form is in the shape of a stand and it can be composed from pipe or rod-shaped materials instead of flat components.

A frame means which has a rigid back support can be made in a continuous casting process costing very little, its manufacturing is also very inexpensive even if it is made from several components as above described.

BRIEF DESCRIPTION OF THE DRAWINGS

The invention will become more readily apparent from the following description of preferred embodiment thereof, shown in the accompanying drawings, in which:

FIG. 4 illustrates a frame means according to the present invention having a back support from a flexible material without an object of observation placed in its place;

FIG. 5 illustrates the frame means of FIG. 4 with a picture placed into its place;

FIG. 6 illustrates a frame means having a back support made from elastic strips;

FIG. 7 is a sectional view through the embodiment illustrated in FIG. 6; and

FIG. 8 is a frame means made in the form of a pipe structure.

DESCRIPTION OF THE PREFERRED EMBODIMENTS

Figure 2:
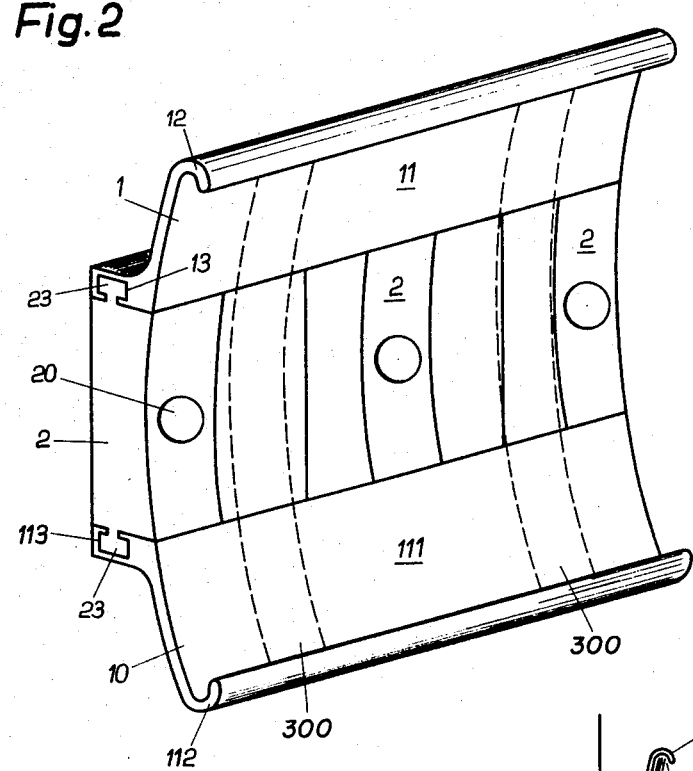
FIG. 2 illustrates the frame means according to FIG. 1, however, in perspective view without an object of observation placed in its place.
Figure 1:
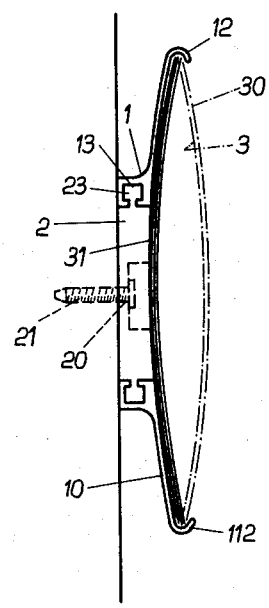
FIG. 1 is an illustration of a frame means according to the present invention put together from several components and having a rigid back support, especially adaptable for displaying smaller objects of observation, in side view.
Figure 3:
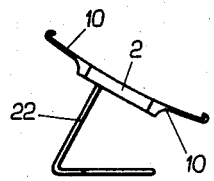
FIG. 3 illustrates the frame means according to FIGS. 1 and 2 in combination with a support adapting the positioning of the frame means on a flat surface.

The frame means with reference to FIGS. 1–3 according to the present invention as being formed as a picture frame means and comprises a base plate means 1 and 10, respectively, which are identical in their construction but they are formed as mirror-images when compared with each other. The base plate means 1 and 10 are held together by a web means 2. The base plate means 1 and 10 have a profile which has been made in a continuous casting process so that the surfaces 11, 111 are formed as full back supporting surfaces for a picture or for an object of observation. The surfaces 11, 111 are slightly concave. The frame means further comprises holding or securing edges 12, 112 which are bent at their ends in a U-shape. As can be seen more clearly in FIG. 1 the apex of such holding edges 12, 112 is made so large that a picture 3 as well as a transparent covering means 30 and, under certain circumstances, including a back support 31 for the picture in the event the picture is made from a very thin material, can be placed into such U-profile. The front leg of the U has a length of only a few mm. so that when the picture is placed into its position, such front leg is hardly observable.

The webs 2, which exemplarily shown as a group of three, are provided with a dove-tail like spring means 23 which fit into the groove portions 13, 113 provided on both frame portions 1 and 10 and, as a result, the frame portions 1 and 10 can be simply shoved over the web 2.

This can be performed by placing the webs 2 with a distance from each other as can be more clearly seen in FIG. 2. The webs 2 in their middle portion, the upper surface of which has a concave shaping, have each a bore 20 through which a screw 21 can protrude for securing the frame means 1 to a wall portion or to a further board.

The insertion of an object of observation, such as a picture 3, is performed in such a manner that the picture 3 and sometimes a back support 31 and a flexible transparent and flat covering means 30, are inserted in a convex shape into both holding or securing edges 12, 112 and, afterwards, it is necessary only to press lightly on the picture set 3, 30, 31 towards the middle of the frame means whereupon the picture set 3, 30, 31 in case there is such back support 31, or cover 30 present, will snap into a concave position and will abut against the back support 11, 3, 111, as seen in FIG. 1. In the event the picture 3 must be changed then the frame means is removed from the wall and from behind through a gap which is between the adjacent webs 2, one presses against the back of the picture 3 or against the back support 31 whereupon the picture 3 will snap together with the covering means 30, and support 31 into a convex position and it can be removed from the frame.

A back support 31 is necessary here only when the object of observation or picture 3 is so thin that it would be squeezed into the gaps present between the adjacent webs 2 and/or it will not lie properly against the back supports 11, 2, 111.

A transparent covering means 30 will be necessary, if not for optical reasons, when the object of observation or picture 3 is not rigid enough in order that it could all by itself snap from the convex inserting position exactly and uniformly into the concave final position.

The covering means 30 can be made from a thin disc or sheet from a transparent synthetic material, such as can be seen in FIG. 2, if the object of observation or picture 3 is rigid enough itself, then individual strips 300 can be spaced from each other and are sufficient as a covering means.

The frame according to the present embodiment is specially adapted in medium sizes as a picture frame which is secured to a wall or which can be hanged on a wall. It can be made from a synthetic material or from a metal, preferably from aluminum, while the webs 2 are made preferably from a synthetic material.

In small sizes it is especially adapted to be put on a stand 22 which can be set upon a flat surface as can be seen in FIG. 3, where the stand 22 is used which is shaped in such a manner that at its upper end it is inserted into a bore 20 made in the middle web 2 and which stand 22 has a sufficient supporting rigidity. This embodiment is especially adaptable to be used as a display material and for which construction a correspondingly stable stand 22 must be used if the frame is large. In smaller sizes the frame means according to the present invention is adapted to receive price boards to writing boards which then can be displayed in show windows, etc.

In the embodiment shown in FIGS. 4 and 5, the frame 4 according to the present invention comprises a flexible elastic material. The back support 40, 400 is made from an elastic material, however, the entire frame without having additional parts can be made from this material since is has rubber-like properties in receiving the picture. In this embodiment the holding or securing edges 41 can be made as a one piece material with the back support 40. Besides rubber, other foam-type synthetic materials can be used so far, in addition to a certain elasticity, they possess also a certain stiffness to be used as frames 4. The holding edges 41 are made in the form of a recess on each side of the plastic material forming the back support.

As can be seen in FIG. 4 the frame means 4 without having an object of observation or picture inserted, has a flat upper surface 40. In the event a picture 3 and also a cover means 30 are inserted in a convex position and together pressed in the direction of the arrow, then they snap into a concave position and press the elastic material together and which assumes the concave shape as a supporting surface identified by 400 in FIG. 5.

Instead of an elastic material as a back support one may use a plastic material and, in the event it doesn't have its own rigidity, then it can be placed into a rigid frame, like 4, which then has the holding edges according to the present invention, which then may be other than the recess 41.

The frame means according to FIGS. 4 and 5 can be manufactured very economically.

A further embodiment of the frame according to the present invention is illustrated in FIGS. 6-8.

This embodiment involves the making of the frame means from pipes or rod-like elements in the form of a stand 5 which then can be used to display one or several picture elements and, shaped accordingly.

The frame or stand 5 has only one surface into which a picture 3 can be placed. The stand 5 consisting of pipes or rod-like elements 50, 51 forms a picture surface while the bent-down pipe or rod-like elements 52, 53 can determine the distance of the overall frame means from a wall onto which the frame is hung or serve as supporting surfaces, while the pipe or rod-like 54, 55 serve also as a counter post for spacing the picture against a wall.

Between the pipe or rod-like elements 50, 51 a pair or more strips 9 are spanned which can be made from an elastic material.

The strips 9 can be secured to the stand 5 in any known manner but are preferred to have the securing or holding edges 6 as the embodiments have above. These holding edges 6 can in this embodiment be molded together with the strips 9 and secured to the bars 50 and 51 by snapping action or welded thereto.

The holding edges 6 for the picture in this embodiment can be made in the form of ledges, it is, however, preferred in this embodiment that the holding edges 6 are combined with the securing means of the elastic bands 9 as can be seen in FIG. 7 in section.

On each tube 50, 51 of the stand 5 there are provided the holding edges in the form of a pair of tube or pipe clamps 6 which are opened to an extent that they can be snapped onto the respective pipes 50, 51 and still be secured thereto. Their circumferential dimension, is, therefore, slightly larger than the half circumference of the associated pipes 50, 51. They have an inwardly directed U-shaped projection 60, 61 which serves as the holding or securing edge for the picture within the meaning of the present invention, as well as a counter surface for the edge of the object of observation or picture when in position. Furthermore the elastic bands 9 are also secured to such clamp projections 60, 61.

The insertion of a picture is made the following way:

All bands or strips 9 lie in one plane. In case of larger frames there can be three or more such strips 9 present. The picture 3 which can have also a covering means 30 or a backing means 31 as in the embodiment described in connection with FIGS. 1-3, is with one of its edges shoved into the projections 60, 61. During this the pipe clamp 6 will turn counterclockwise a slight amount and then the picture 3 is pressed into its convex position by hand and its other edge becomes placed into the projections 60, 61 of the other pipe clamp 6. (The right side of FIG. 7). After this the middle portion of the picture 3 is pressed down in the direction of the arrow whereupon the picture will lie against the strips 9 and will snap over into its concave final position (the left side of FIG. 7). For sake of clarity it is noted that FIG. 7 represents the above-described operation of placing a picture 3 into the frame means of FIG. 6 or 8 and the upper or right hand showing of FIG. 7 represent the picture in its initial convex position and the lower or left hand representation shows the picture in its final position, that is, in the concave position.

With further reference to FIG. 7 it is clearly seen that the right pipe clamp 6 is shown in a position in which the object of observation or picture 3 inserted initially into it, while the left side pipe-clamp 6 is illustrated in the position which it will assume when the picture is in its final concave position. Inasmuch as the pipe clamps 6 are placed on the pipes 50, 51 movably, they are capable of performing the illustrated movement between initial and final positions.

In the event the pipe clamps 6 are placed on the pipes 50, 51 in a manner that they cannot rotate, that is, they are fixedly secured with the pipes 50, 51, therefore, the apex portion of their U-shaped projections 60, 61 must be made wide enough that the object or picture 3 which is to be placed in them can be moved without hindrance between its initial convex and final concave position. The sitting or abutting of the picture 3 is the same in both cases since its final position is determined only by the distance between the clamps or supporting edges 6 as well as by the distance of the pipes 50, 51 and by the elasticity or rigidity of the picture itself.

With reference to FIG. 8, it illustrates an embodiment of the present invention serving for the reception of several objects of observation or pictures.

The pipe or rod pieces 52, 53 of FIG. 6 are extended in a manner that the stand 7 of FIG. 8 will have a side view of a quadrate. The pipes 70–71, 72–72, 72–74, 74–75 and 73–75 form each a picture surface so that such stand shown in FIG. 8 made up from pipes or rod-like elements can have 7 pictures at the same time.

For each picture carrying surface there are four pipe clamps 6 provided, similar to those described in connection with FIGS. 6 and 7 and which at the same time connect the elastic strips which can be similar to the strips 9 described in connection with FIGS. 6 and 7. On the upper surface of the stand 7 of FIG. 8 is a picture 3 shown so that the strips 9 on the upper surface cannot be seen, however, they are easily observable on the remaining sides and shown with dashed lines.

Instead of strips 9 one may use a clot made from an elastic material and which would pass from surface to surface and tied in at the clamps 6.

I wish it to be understood that I do not desire to be limited to the exact details of construction shown and desribed, for obvious modifications will occur to a person skilled in the art.

Having thus described the invention, what I claim as new and desire to be secured by Letters Patent, is as follows:

1. A frame adapted to receive, removably, at least one two-dimensional object, said frame comprising, in combination:

edge supports adapted to receive therein the edges of the object, said edge supports having end portions and being spaced apart from each other for a distance slightly smaller than the corresponding straight dimension of the object, a back support for supporting the object when it is placed in position in said frame engaged with relation to said edge supports; said back support having a middle portion lying behind an imaginary connecting straight line between said edge supports, whereby the object placed into said frame will assume a concave position when positioned abutting against said back support;

securing means operable for securing said middle portion and said end portions together, said securing means comprising groove means and resilient means to be slidably engaged in said groove means; and said middle portion comprising a plurality of web means spaced apart from each other when said web means are assembled into said frame, said web means forming a rigid structure with said edge supports and said back support.

* * * * *